Jan. 21, 1969          L. MESSER          3,423,313
HIGH SOLID CONTENT SLURRY SEPARATING METHOD
Filed Feb. 15, 1967
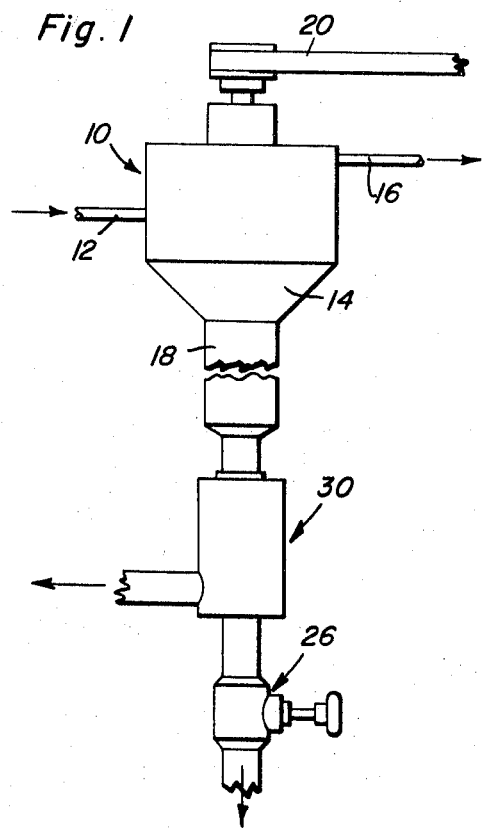
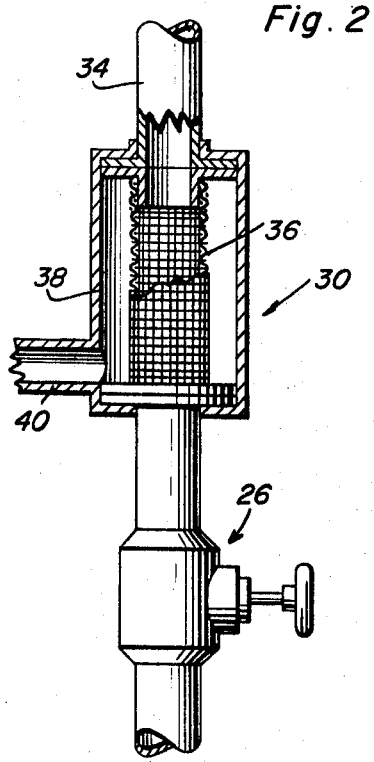
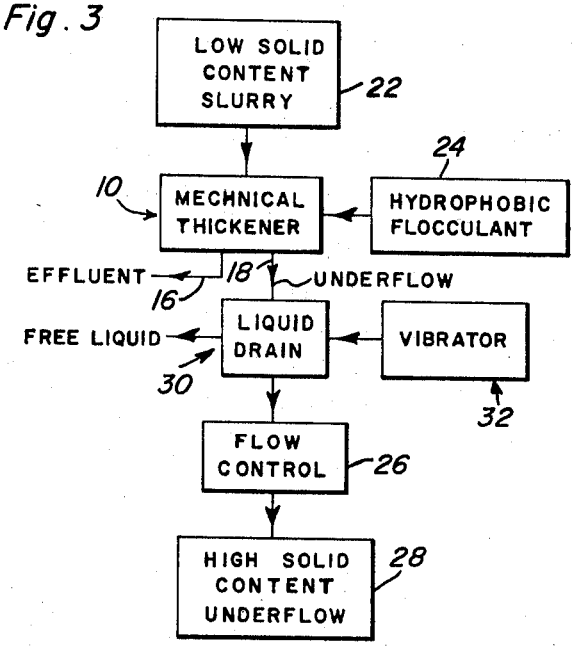
Leonard Messer
              INVENTOR.

United States Patent Office 3,423,313
Patented Jan. 21, 1969

3,423,313
HIGH SOLID CONTENT SLURRY SEPARATING METHOD
Leonard Messer, Pittsburgh, Pa. (% American Minechem Corp., P.O. Box 231, Coraopolis, Pa. 15108)
Continuation-in-part of application Ser. No. 440,727, Mar. 18, 1965. This application Feb. 15, 1967, Ser. No. 632,849
U.S. Cl. 210—54     4 Claims
Int. Cl. C02b 1/20

ABSTRACT OF THE DISCLOSURE

The separation of a high solid content underflow from the liquid phase of a low solid content slurry introduced into a mechanical type of thickener. A flocculant having a hydrophobic characteristic is added to the slurry to increase the operational speed of the thickener and a dewatering device is used to drain the pockets of liquid carried by the underflow discharged from the thickener.

---

This application is a continuation-in-part of my prior co-pending application, Ser. No. 440,727, filed Mar. 18, 1965, now abandoned.

This invention relates to improvements in the separation of liquid phases from slurries and more particularly to the method and apparatus for reducing the liquid content of a slurry.

Mechanical thickeners are commonly utilized in material separating processes for various purposes. In one type of thickener, the slurry is introduced into a vertical cone and agitated as it passes through the central portion of the cone. A low solid content slurry is usually introduced into such mechanical thickeners so that a relatively higher solid content slurry settles as an underflow while an overflow of effluent is peripherally removed from the thickener. It will of course be appreciated that the operational speed of such apparatus is severely limited in performing its function because of the rate at which the high solid content underflow is withdrawn. In order to increase the speed of the separation process, chemical reagents have been introduced which act as flocculants. These flocculants increase the settling rate of the desired solids in the slurry being processed by agglomeration or coaggulation of the solids in the underflow. The settling rate may be further increased when utilizing a flocculant having hydrophobic characteristics. Several flocculants of this type are known. However, attempts to improve the efficiency of the mechanical thickener by mixing the incoming slurry with a hydrophobic type of flocculant, results in a product underflow within which a relatively large quantity of free water is entrained making the underflow product difficult to handle. It is therefore a primary object of the present invention to provide an arrangement whereby the efficiency of a mechanical thickener may be enhanced by the introduction of a hydrophobic flocculant without the aforementioned disadvantage. Dewatering facilities are therefore provided whereby the underflow product or sludge discharged from the mechanical thickener may have the pockets of water carried therewith drained.

An additional object of the present invention in accordance with the foregoing object, is to provide an apparatus for economically removing free liquid trapped within a high solid content slurry as it is being withdrawn from a mechanical thickener at a controlled rate of flow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a simplified diagrammatic view of the apparatus associated with the method of the present invention.

FIGURE 2 is an enlarged partial view of the apparatus shown in FIGURE 1 with parts broken away and shown in section illustrating the dewatering device.

FIGURE 3 is a flow diagram illustrating the method of the present invention.

FIGURE 1 illustrates a mechanical thickener generally denoted by reference numeral 10 of the type wherein a low solid content slurry is introduced through the inlet conduit 12 to the center of the thickener. The solids in the slurry therefore settle out in the settling basin portion 14 of the thickener as the liquid travels upwardly to the perimeter of the thickener. An overflow or effluent constituting a clarified liquid phase is therefore withdrawn from the thickener by the conduit 16 while a relatively high solid content slurry moves downwardly through a vertically elongated underflow outlet 18. Various mechanical facilities are provided including for example rakes and centrifugal devices driven by a source of motive power 20 whereby the settled phase of the slurry is moved toward the center of the settling basin 14 from which the underflow is withdrawn.

Thickeners of the aforementioned type may be used as classifiers in the processing of minerals and oils and may also be used for water clarification as in the coal mining industry for recovery of those fines and refuse which cannot be recovered by other methods. In order to increase the efficiency and speed with which the solid and liquid phases of the inflow slurry may be separated, it has been proposed that a chemical flocculant be mixed with the inflow slurry. In this way, the settling rate within the thickener is increased because of the flocculated solids in the slurry. In accordance with the present invention, the flocculant selected is hydrophobic resulting in a still more rapid settling of the solids. However, one of the problems in the coal industry for example is that the resulting underflow mass from the thickener is rendered difficult to transport and handle because of the pockets of free liquid or water that become entrained therewithin as a result of the hydrophobic characteristic of the flocculant. Therefore, the use of hydrophobic flocculants to be effective in enhancing the separating process, must be accompanied by an economical and efficient method for dewatering the resulting underflow.

As shown in FIGURE 3, the method of the present invention therefore involves the introduction of a low solid content slurry 22 such as froth flotation tailings or coal washery effluents containing mineral particles in suspension into the mechanical thickener 10 as well as the hydrophobic flocculant 24 resulting in an outflow of a clarified effluent and a thickened underflow. One commercially available flocculant successfully used in accordance with this invention is a re-agent known as "Polyflok P X," manufactured by the Yorkshire Dyeware and Chemical Co. Ltd., now disclosed in British Patent No. 981,963, published Feb. 3, 1965. Hydrophobic flocculants of this type are disclosed in U.S. Patent No. 2,862,880 to Clemens.

The underflow may thereby be withdrawn from the thickener at a controlled flow rate by means of a flow controlling component 26 exceeding the maximum rate otherwise associated with the thickener. Thus, the outflow of the underflow product 28 may be regulated to a flow rate at which the mechanical thickener 10 is ordinarily overloaded if not for the introduction of the hydrophobic flocculant 24. The underflow then passes through a dewatering device 30 so that the free liquid entrained within the underflow may be drained. A vibrator 32 may also be provided and operatively connected to the dewatering device 30 so as to augment drainage of the free liquid from the underflow.

Referring now to FIGURES 1 and 2, it will be observed that the underflow from the outlet 18 of the thickener is withdrawn through a conduit 34 passing through the dewatering device 30. The dewatering device consists of a foraminous conduit section 36 the walls of which are made of any suitable material including a porous structure, wire mesh, fabric, or perforated metals or plastics with suitable reinforcement. The porosity of the material or the apertures in the material forming the walls of the foraminous conduit section 36, are so dimensioned to permit drainage of a maximum quantity of water and a minimum quantity of solids passing through the conduit section at the flow rate regulated by the flow control valve 26. An imperforate jacket 38 may enclose the foraminous conduit section 36 so that the water collected therewithin may be readily removed by the drain pipe 40. It will therefore be appreciated, that the underflow product 28 emerging from the dewatering device 30 will have a higher solid content.

From the foregoing description, the practice of the method of the present invention and construction of the apparatus associated therewith, will be apparent. Thus, the present invention is particularly useful in connection with the handling of a self-dewatering underflow from thickeners, classifiers or settling tanks while at the same time avoiding the disadvantages of a "soupy" underflow product resulting from the introduction of reagents such as the polyacrylamide disclosed in British Patent No. 981,963, aforementioned or a polyamine having a hydrophobic group as disclosed in U.S. Patent No. 2,862,880. Further, the purposes of the present invention are achieved in a relatively efficient and economical fashion since it does not require use of any complex apparatus or re-routing of the underflow product.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a process for separating a high solid content slurry from a low solid content slurry comprising the steps of: introducing said low solid content slurry into a mechanical thickener having a rotating slurry contacting element producing a predetermined maximum outflow rate for the high solid content slurry from the thickener chamber; mixing the low solid content slurry with a hydrophobic flocculant to increase the settling rate of the slurry within the chamber of the mechanical thickener; withdrawing a flocculated slurry from the thickener chamber at a rate exceeding said predetermined maximum outflow rate; and draining free liquid carried with the flocculated slurry withdrawn from the thickener chamber by flowing said withdrawn slurry under controlled pressure conditions axially through a tubular filter means located in the outlet passage of said chamber.

2. The method of claim 1 wherein said flocculant is a polyacrylamide mixed with the low solid content slurry to form flocs that repel water.

3. The method of claim 2 wherein said low solid content slurry is a coal washery effluent containing mineral particles in suspension.

4. The method of claim 1 wherein said low solid content slurry is a coal washery effluent containing mineral particles in suspension.

References Cited

UNITED STATES PATENTS

| | | |
|---|---|---|
| 2,603,354 | 7/1952 | Way et al. |
| 2,834,720 | 5/1958 | Savoca. |
| 2,862,880 | 12/1958 | Clemens _____ 210—52 |
| 3,094,485 | 6/1963 | Gaudin et al. |
| 3,138,550 | 6/1964 | Woolery. |
| 3,241,676 | 3/1966 | Neuville et al. _____ 210—433 X |
| 3,342,731 | 9/1967 | Baumann et al. _____ 210—51 X |

FOREIGN PATENTS

| | | |
|---|---|---|
| 1,141,601 | 12/1962 | Germany. |
| 981,963 | 2/1965 | Great Britain. |

OTHER REFERENCES

"Separan 2610 in the Coal Industry," a publication of the Dow Chemical Co., Midland, Mich., April 1956, pp. 3, 7, 8 and 10–12 particularly relied on.

Perry et al., Perry's Chemical Engineers' Handbook, 4th Edition, McGraw-Hill, N.Y., 1963, 19–42 to 19–54, 19–53 particularly relied on.

REUBEN FRIEDMAN, *Primary Examiner.*

W. S. BRADBURY, *Assistant Examiner.*

U.S. Cl. X.R.

210—73, 308, 433